(12) United States Patent
Shu et al.

(10) Patent No.: US 11,215,962 B2
(45) Date of Patent: Jan. 4, 2022

(54) PLC-BASED ELECTRICAL AUTOMATION CONTROL DEVICE

(71) Applicant: Huaihua University, Huaihua (CN)

(72) Inventors: Wei Shu, Huaihua (CN); Dajiang He, Huaihua (CN); Hongbiao Song, Huaihua (CN)

(73) Assignee: HUAIHUA UNIVERSITY, Huaihua (CN)

( * ) Notice: Subject to any disclaimer, the term of this patent is extended or adjusted under 35 U.S.C. 154(b) by 115 days.

(21) Appl. No.: 16/742,269

(22) Filed: Jan. 14, 2020

(65) Prior Publication Data

US 2020/0225630 A1  Jul. 16, 2020

(30) Foreign Application Priority Data

Jan. 15, 2019 (CN) .......................... 201910078615.9

(51) Int. Cl.
*G05B 19/05* (2006.01)
(52) U.S. Cl.
CPC ........ *G05B 19/05* (2013.01); *G05B 2219/163* (2013.01)
(58) Field of Classification Search
None
See application file for complete search history.

(56) References Cited

U.S. PATENT DOCUMENTS

| | | | | |
|---|---|---|---|---|
| 2,620,087 A | * | 12/1952 | Peterson | ................ F16K 17/19 220/372 |
| 2002/0074190 A1 | * | 6/2002 | McCrandall | ...... H01L 21/67775 187/244 |
| 2002/0079754 A1 | * | 6/2002 | Lai | ....................... H02K 5/1737 310/67 R |
| 2004/0257766 A1 | * | 12/2004 | Rasmussen | ........ H05K 7/20736 361/689 |
| 2005/0099073 A1 | * | 5/2005 | Yang | ...................... H02K 7/003 310/75 R |
| 2007/0249280 A1 | * | 10/2007 | Johnson | .................... B66F 7/14 454/354 |
| 2011/0064372 A1 | * | 3/2011 | Solheid | .................. G02B 6/445 385/135 |
| 2014/0086758 A1 | * | 3/2014 | Kim | ...................... F04D 27/004 417/44.1 |
| 2014/0302772 A1 | * | 10/2014 | Nizich | .................. F24F 13/084 454/334 |
| 2017/0036886 A1 | * | 2/2017 | Penn | ........................ E04G 3/30 |

* cited by examiner

*Primary Examiner* — Mohammad Ali
*Assistant Examiner* — David Earl Ogg
(74) *Attorney, Agent, or Firm* — Wenderoth, Lind & Ponack, L.L.P.

(57) ABSTRACT

The present invention relates to the field of control device technologies, and discloses a PLC-based electrical automation control device, including an extensible lifting base and a control box mounted on a top of the lifting base. A lifting platform that can move up and down is arranged inside the control box, an automation controller is installed on a top of the lifting platform, both sides of a bottom of the lifting platform are installed with a vertical spring, and a bottom of the spring is fixedly connected to an inner bottom wall of the control box. Left and right inner walls of the control box are each installed with a drive motor, and a rotating disk driven by the drive motor is arranged inside the control box.

10 Claims, 3 Drawing Sheets

PLC-BASED ELECTRICAL AUTOMATION CONTROL DEVICE

TECHNICAL FIELD

The present invention relates to the field of control device technologies, and in particular, to a PLC-based electrical automation control device.

BACKGROUND

A programmable logic controller (PLC) is a kind of digital operation electronic system specially designed for application in an industrial environment. It uses a programmable memory that stores instructions for performing logical operations, sequence control, timing, counting, arithmetic operations, or the like within it. It controls various types of machinery or production process through digital or analog input and output. With the advancement of PLC technologies, control units of many devices now use PLC devices.

The use of PLC devices for equipment control may make the matching of industrial control equipment easier; therefore, there are many PLC-based electrical control devices on the market. However, when are used, these devices have poor adaptability and cannot adapt to different environments, providing more convenient use and affecting control efficiency. In this case, the present invention proposes a PLC-based electrical automation control device, to solve the foregoing problems.

SUMMARY

I. The Technical Problem to be Solved

In view of the shortcomings of the prior art, the present invention provides a PLC-based electrical automation control device, which has the advantages of greater adaptability and better use convenience. The present invention solves problems that conventional control devices have poor adaptability, cannot be used in different environments, are very inconvenient to use, and affect the control efficiency.

II. Technical Solution

In order to achieve the above objectives of greater adaptability and better use convenience, the present invention provides the following technical solutions: a PLC-based electrical automation control device includes an extensible lifting base and a control box mounted on a top of the lifting base. A lifting platform that can move up and down is arranged inside the control box, an automation controller is installed on a top of the lifting platform, both sides of a bottom of the lifting platform are installed with a vertical spring, and a bottom of the spring is fixedly connected to an inner bottom wall of the control box.

Left and right inner walls of the control box are each installed with a drive motor. A rotating disk driven by the drive motor is arranged inside the control box. An outer edge of the rotating disk is fixedly connected to uniformly distributed fan blades, and one side of the rotating disk away from the drive motor is fixedly connected to a coaxial clutch device. An output end of the coaxial clutch device is installed with a matching rotating shaft, and an end of the rotating shaft is fixedly connected to a winding wheel. A pull rope is wound inside the winding wheel, and a bottom end of the pull rope is fixedly connected to the top of the lifting platform.

Preferably, a top of the control box is hinged with a protective cover that can be opened upward, and the top of the control box and left and right sides of the protective cover are respectively opened with a positioning groove. A sealing cushion is fixedly connected to a bottom groove wall of the positioning groove, and a positioning plate extending into the positioning groove is fixedly connected to a side of the protective cover.

Preferably, the left and right sides of the control box are each provided with a vertical guide rail, a guide wheel installed on the lifting platform is provided inside the guide rail, and the pull rope and the spring both are fixedly connected to a mounting plate on the guide wheel.

Preferably, the lifting base includes a fixed base with a cross-sectional area, a U-shaped support plate is installed above the fixed base, the support plate is internally slidably connected to a movable plate that can be raised and lowered, and a connecting plate fixedly connected to the bottom of the control box is installed on the top of the movable plate.

Preferably, a pushing motor below the movable plate is installed inside the support plate, and a cam driven by the pushing motor to push the movable plate up and down is disposed inside the support plate.

Preferably, a rear side baffle plate fixedly connected to the bottom of the movable plate is provided inside the support plate, an air inlet is opened at a bottom of the rear side baffle plate, and an air inlet hole opposite to the air inlet is opened at a rear side wall of the support plate.

Preferably, a control member is installed on an inner bottom wall of the support plate, and the control member internally includes a PLC controller, a rotary speed controller, a steering controller, a temperature sensor, and a timer. An output end of the PLC controller is electrically connected to an input end of the temperature sensor, the output end of the PLC controller is electrically connected to an input end of the timer, and an output end of the timer is electrically connected to input ends of the rotary speed controller and the steering controller.

Preferably, a front side baffle plate fixedly connected to a bottom front side of the movable plate is provided inside the support plate, an air outlet is opened at a bottom of the front side baffle plate, and an air outlet hole opposite to the air outlet is opened at a front side bottom wall of the support plate.

Preferably, a bottom of a rear side wall of the support plate is fixedly connected to a pick-and-place cover located below the air inlet hole through a fixing bolt.

Preferably, a top of a left side wall of the control box is opened with a pressure stabilization hole for stabilizing an internal air pressure of the control box, and a filter screen is installed inside the pressure stabilization hole.

III. Beneficial Effects

Compared with the prior art, the present invention provides a PLC-based electrical automation control device, and has the following beneficial effects.

1. In the PLC-based electrical automation control device, when the drive motor is rotated forward, the rotating disk is rotated, and when the rotating disk is rotated, the fan blades are rotated, which pumps external air into the control box to increase the air flow in the control box. In this process, due to the function of the clutch device, the rotating shaft will not be rotated, so that the heat in the control box can be quickly dissipated, and the filter screen can prevent external dust from entering the control box.

2. The PLC-based electrical automation control device can drive the clutch device and the rotating shaft to rotate synchronously when the drive motor is reversed, and when the rotating shaft is rotated, it can drive the winding wheel to rotate, thus winding the pull rope. After the pull rope is wound, the lifting platform can be moved. When the lifting platform is moved, the automation controller can be moved, so that the height of the automation controller is changed and operators of different heights can easily use the automation controller. And at this time, the rotating disk can also be driven by the drive motor to drive the rotating disk to rotate. When the rotating disk is rotated, the fan blades can be rotated. In this process, external air can flow through the opening in the bottom of the control box and discharge the high-temperature gas in the control box from the pressure stabilization hole, thereby taking away the heat in the control box and increasing the heat dissipation rate in the control box.

3. In the PLC-based electrical automation control device, the pushing motor can drive the cam to rotate. When the cam is rotated, it can move the movable plate. The height of the movable plate can be changed along with the height change of the connecting plate. In this process, the height of the control box is also changed, which can more conveniently adjust the height of the automation controller.

In the figures: 1. a lifting base, 2. a control box, 3. a lifting platform, 4. an automation controller, 5. a spring, 6. a drive motor, 7. a rotating disk, 8. a fan blades, 9. a clutch device, 10. a rotating shaft, 11. a winding wheel, 12. a pull rope, 13. a protective cover, 14. a positioning groove, 15. a sealing cushion, 16. a positioning plate, 17. a guide rail, 18. a guide wheel, 19. a fixed base, 20. a support plate, 21. a movable plate, 22. a connecting plate, 23. a pushing motor, 24. a cam, 25. a rear side baffle plate, 26. an air inlet, 27. an air inlet hole, 28. a control member, 29. a front side baffle plate, 30. an air outlet, 31. an air outlet hole, 32. a pick-and-place cover, 33. a fixing bolt, 34. a pressure stabilization hole, and 35. a filter screen.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
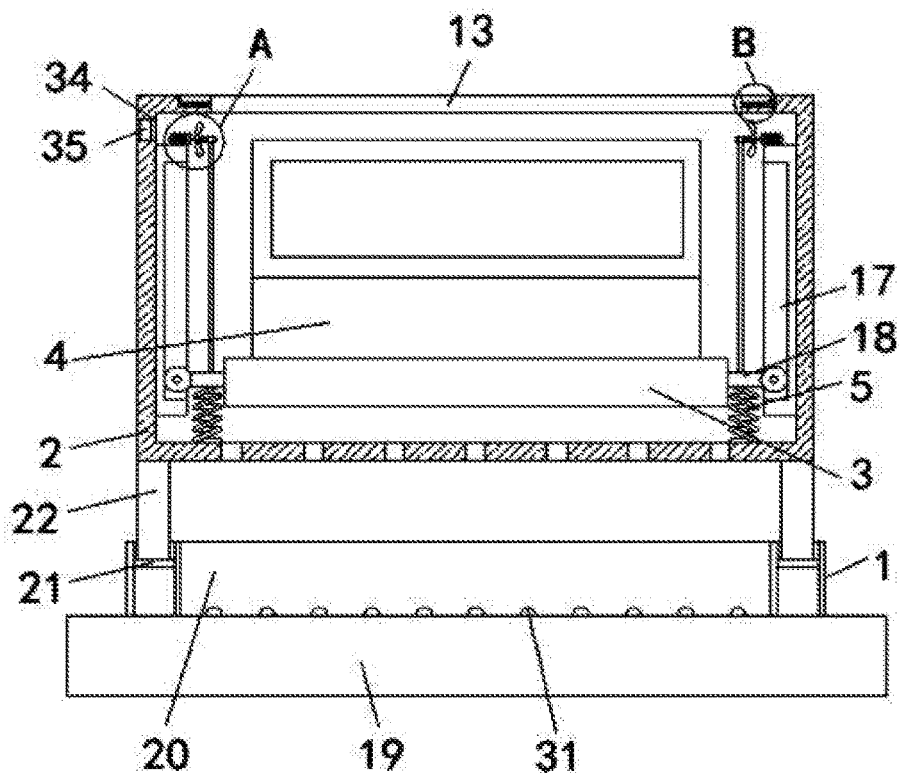
FIG. 1 is a schematic structural diagram of a PLC-based electrical automation control device according to the present invention.
Figure 2:
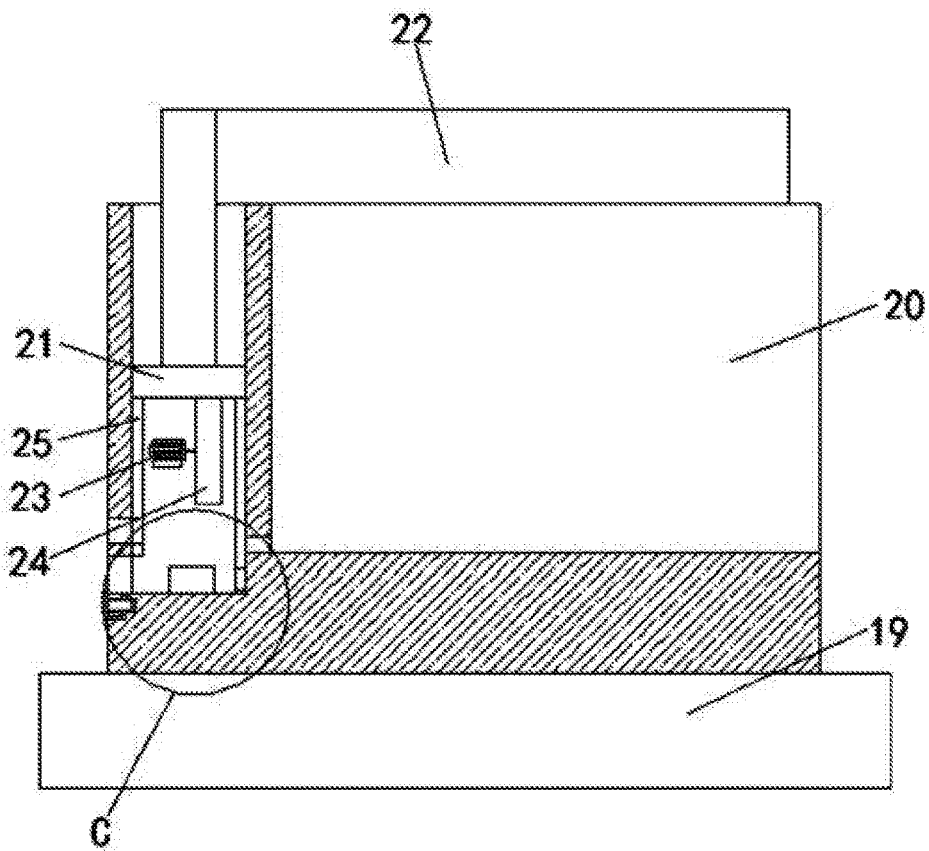
FIG. 2 is a schematic structural diagram of a lifting base of a PLC-based electrical automation control device according to the present invention.
Figure 3:
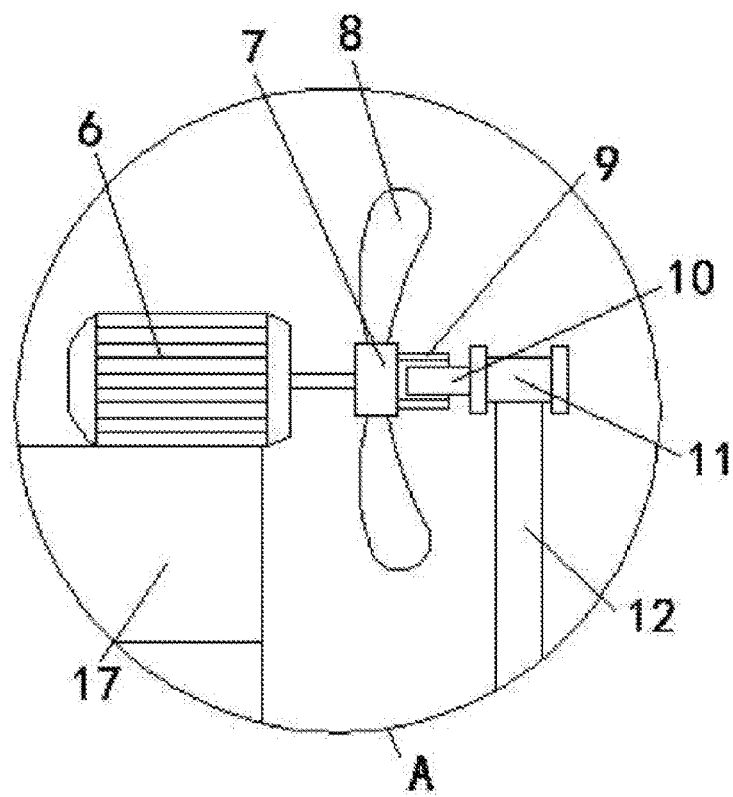
FIG. 3 is an enlarged view of a portion A in FIG. 1 of a PLC-based electrical automation control device according to the present invention.
Figure 4:
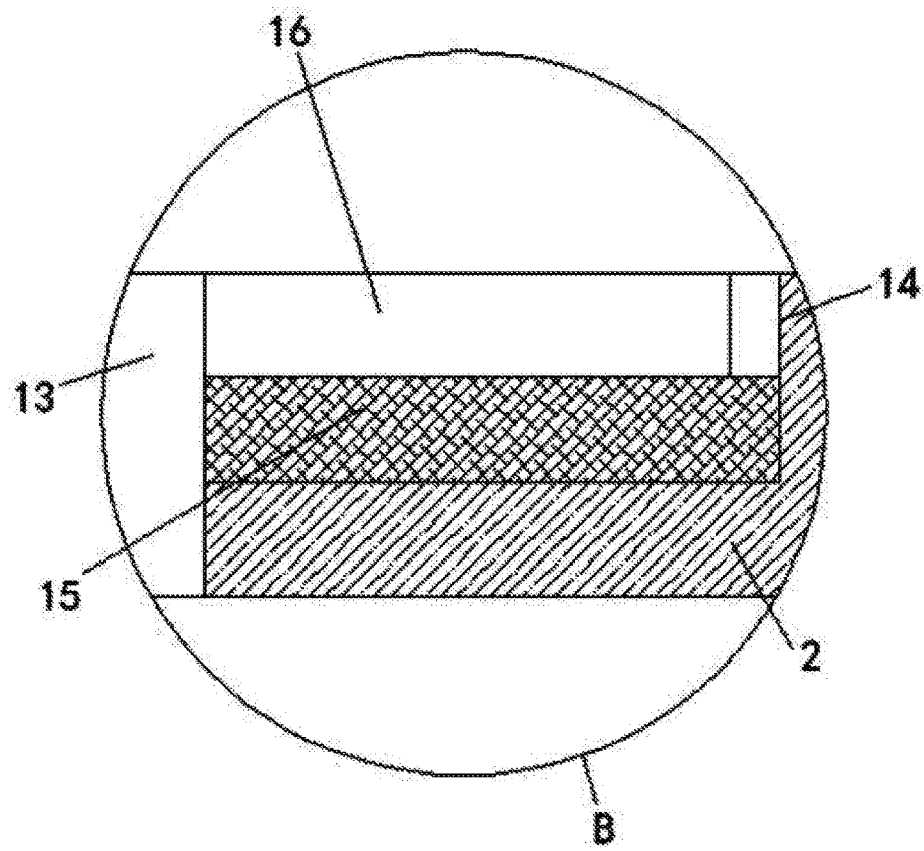
FIG. 4 is an enlarged view of a portion B in FIG. 1 of a PLC-based electrical automation control device according to the present invention.
Figure 5:
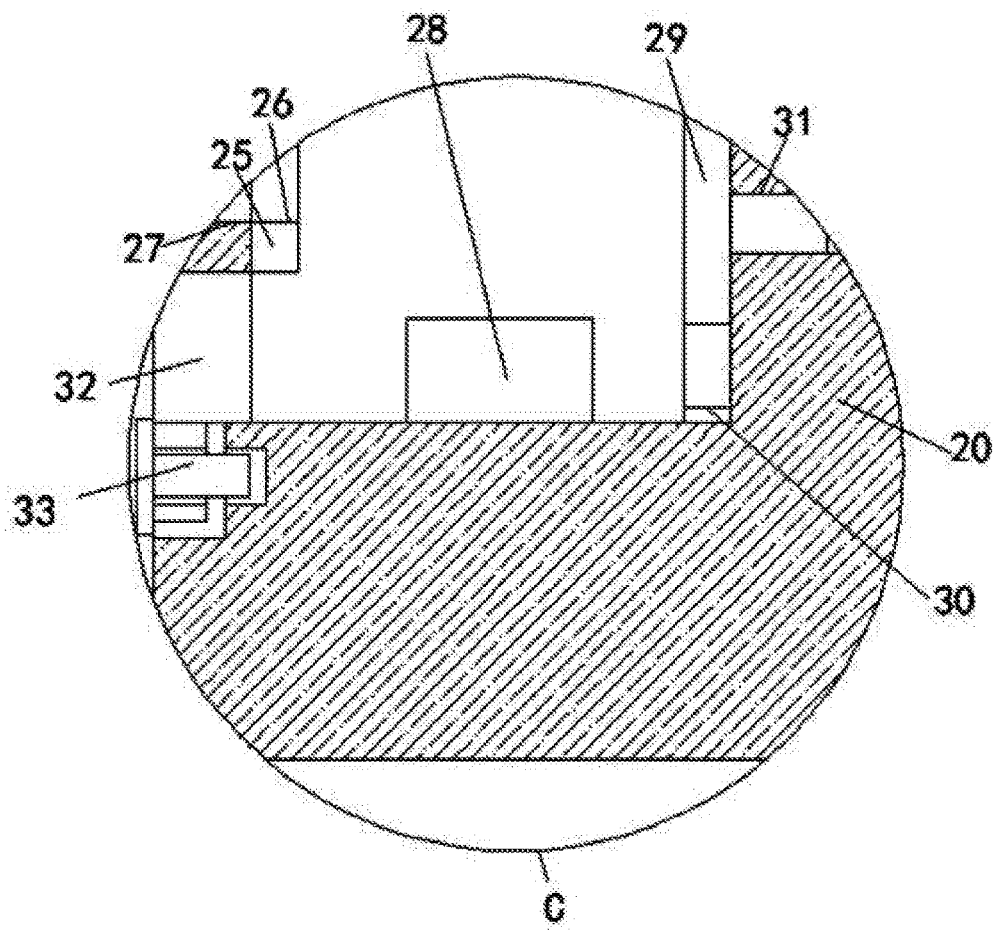
FIG. 5 is an enlarged view of a portion C in FIG. 2 of a PLC-based electrical automation control device according to the present invention.
Figure 6:
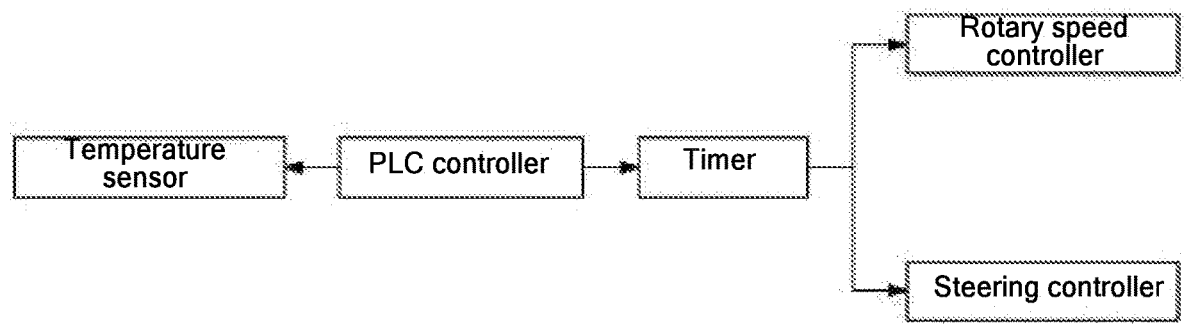
FIG. 6 is a system diagram of a PLC-based electrical automation control device according to the present invention.

Referring to FIG. 1 to FIG. 6, a PLC-based electrical automation control device includes an extensible lifting base 1 and a control box 2 mounted on a top of the lifting base 1. A lifting platform 3 that can move up and down is arranged inside the control box 2, an automation controller 4 is installed on a top of the lifting platform 3, both sides of a bottom of the lifting platform 3 are installed with a vertical spring 5, and a bottom of the spring 5 is fixedly connected to an inner bottom wall of the control box 2.

Left and right inner walls of the control box 2 are each installed with a drive motor 6, and a rotating disk 7 driven by the drive motor 6 is arranged inside the control box 2, an outer edge of the rotating disk 7 is fixedly connected to uniformly distributed fan blades 8, one side of the rotating disk 7 away from the drive motor 6 is fixedly connected to a coaxial clutch device 9, an output end of the coaxial clutch device 9 is installed with a matching rotating shaft 10, an end of the rotating shaft 10 is fixedly connected to a winding wheel 11, a pull rope 12 is wound inside the winding wheel 11, and a bottom end of the pull rope 12 is fixedly connected to the top of the lifting platform 3. When the drive motor 6 is rotated forward, the rotating disk 7 is rotated, and when the rotating disk 7 is rotated, the fan blades 8 are rotated, which pumps external air into the control box 2 to increase the air flow in the control box 2. In this process, due to the function of the clutch device 9, the rotating shaft 10 will not rotate. The clutch device 9 and the rotating shaft 10 can be driven to rotate synchronously when the drive motor 5 is reversed, and when the rotating shaft 10 is rotated, it can drive the winding wheel 11 to rotate, thus winding the pull rope 12. After the pull rope 12 is wound, the lifting platform 3 can be moved. When the lifting platform 3 is moved, the automation controller 4 can be moved, so that the height of the automation controller 4 is changed and operators of different heights can easily use the automation controller 4.

During the ascent of the automation controller 4, in order to operate the automation controller 4 more conveniently, preferably, a top of the control box 2 is hinged with a protective cover 13 that can be opened upward, the top of the control box 2 and left and right sides of the protective cover 13 are respectively opened with a positioning groove 14, a sealing cushion 15 is fixedly connected to a bottom groove wall of the positioning groove 14, and a positioning plate 16 extending into the positioning groove 14 is fixedly connected to a side of the protective cover 13. When the automation controller 4 rises, the protective cover 13 can be lifted. After the protective cover 13 is opened up, the automation controller 4 protrudes from the control box 2. When the automation controller 4 is not used, the protective cover 13 can protect the automation controller 4 in the control box 2.

In addition, when the pull rope 12 pulls the lifting platform 3 to move, if the lifting platform 3 is shifted, the automation controller 4 may be damaged. Preferably, a vertical guide rail 17 is installed at the bottom of the left and right sides of the control box 2, a guide wheel 18 installed on the lifting platform 3 is provided inside the guide rail 17, and the pull rope 12 and the spring 5 are fixedly connected to the mounting plate on the guide wheel 18. When the lifting platform 3 moves, the guide wheel 18 moves within the guide rail 17, on the one hand, the moving stability of the lifting platform 3 can be maintained, and on the other hand, the friction force when the lifting platform 3 moves can be reduced.

Moreover, in order to ensure the stability of the control box 2 and to maintain the height of the control box 2, it is preferable that the lifting base 1 includes a fixed base 19 with a cross-sectional area, a U-shaped support plate 20 is installed above the fixed base 19, the support plate 20 is internally slidably connected to a movable plate 21 that can be raised and lowered, and a connecting plate 22 fixedly connected to the bottom of the control box 2 is installed on the top of the movable plate 21. The fixed base 19 has a contact surface with the ground, and it is more stable to place. In addition, the height of the movable plate 21 can be adjusted as required. The height of the movable plate 21 can be changed while the height of the connecting plate 22 is changed. In this process, the height of the control box 2 is also changed and the height of the automation controller 4 can be adjusted more conveniently.

In order to facilitate the movement of the movable plate 21 and also to reduce the loss of manpower, preferably, a pushing motor 23 below the movable plate 21 is installed inside the support plate 20, and a cam 24 driven by the pushing motor 23 to push the movable plate 21 up and down is disposed inside the support plate 20. The pushing motor 23 can drive the cam 24 to rotate. When the cam 24 is rotated, the movable plate 21 can be pushed to move, and the height of the movable plate 21 can be adjusted.

When the movable plate 21 moves up and down, the space between the movable plate 21 and the support plate 20 is changed. Preferably, a rear side baffle plate 25 fixedly connected to the bottom of the movable plate 21 is provided inside the support plate 20, and an air inlet 26 is provided at the bottom of the rear side baffle plate 25. The air inlet hole 27 opposite to the air inlet 26 is opened at a rear side wall of the support plate 20. When the moving plate 21 rises, air can be drawn from the space between the air inlet 26 and the air inlet hole 27 to the inside of the support plate 20. As the movable plate 21 moves, the air inlet 26 and the air inlet hole 27 are staggered when the rear side baffle plate 25 rises.

In order to conveniently control the rotation of the drive motor 6 and the pushing motor 23, and also to control other circuit components, preferably, a control member 28 is installed on an inner bottom wall of the support plate 20, and the control member 28 internally includes a PLC controller, a rotary speed controller, a steering controller, a temperature sensor, and a timer. An output end of the PLC controller is electrically connected to an input end of the temperature sensor, the output end of the PLC controller is electrically connected to an input end of the timer, and an output end of the timer is electrically connected to input ends of the rotary speed controller and the steering controller. The temperature sensor detects the temperature of the entire device. When the temperature is high, the alarm signal is transmitted to the PLC controller, the PLC controller can issue instructions to speed up the rotation speed of the drive motor 6, and increase the rotation and air exhaust efficiency of the fan blades 8. Moreover, the rotation direction of the drive motor 6 and the pushing motor 23 can be controlled by the steering controller, thereby achieving different functions.

After the movable plate 21 rises to a certain height, the support plate 20 is filled with air, and the air in the support plate 20 may need to be exhausted when the movable plate 21 is lowered. Preferably, a front side baffle plate 29 fixedly connected to a bottom front side of the movable plate 21 is provided inside the support plate 20, an air outlet 30 is opened at a bottom of the front side baffle plate 29, and an air outlet hole 31 that is located above the air outlet 30 and is opposite to the air outlet 30 is opened at a front side bottom wall of the support plate 20. After the movable plate 21 rises to a certain height, the air outlet 30 and the air outlet hole 31 are at the same height. When the movable plate 21 descends, the air in the support plate 20 is squeezed out of the air outlet 30 and the air outlet hole 31, and the top of the fixed base 19 is cleaned.

Furthermore, if the control member 28 is damaged and needs to be repaired, preferably, the bottom of the rear side wall of the support plate 20 is fixedly connected to a pick-and-place cover 32 located below the air inlet hole 27 through a fixing bolt 33, and the fixing bolt 33 can be screwed out to remove the pick-and-place cover 32, thus perform maintenance on the control member 28.

During the rotation of the fan blades 8, air is drawn into the control box 2, preferably, a top of a left side wall of the control box 2 is opened with a pressure stabilization hole 34 for stabilizing an internal air pressure of the control box 2, and a filter screen 35 is installed inside the pressure stabilization hole 34. The gas flows from the pressure stabilization hole 34 to the control box 2 to increase the air flow velocity in the control box 2, so that the temperature in the control box 2 can be quickly lowered, and the filter screen 35 can prevent external dust from entering the control box 2.

The electrical components appearing in this description are all connected to an external main controller and a 220V mains power, and the main controller can be a conventional known device that is controlled by a computer or the like.

It should be noted that terms "including", "comprising" or any other variants thereof are intended to cover non-exclusive inclusion, so that a process, method, article or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements.

Although the embodiments of the present invention have been illustrated and described, it should be understood that those of ordinary skill in the art may make various changes, modifications, replacements and variations to the above embodiments without departing from the principle and spirit of the present invention, and the scope of the present invention is limited by the appended claims and their legal equivalents.

What is claimed is:

1. A programmable logic controller (PLC)-based electrical automation control device, comprising an extensible lifting base (1) and a control box (2) mounted on a top of the lifting base (1), wherein a height of the extensible lifting base (1) is adjustable; a lifting platform (3) that can move up and down is arranged inside the control box (2), an automation controller (4) is installed on a top of the lifting platform (3), both sides of a bottom of the lifting platform (3) are installed with a vertical spring (5), and a bottom of the spring (5) is fixedly connected to an inner bottom wall of the control box (2);

left and right inner walls of the control box (2) are each installed with a drive motor (6), a rotating disk (7) driven by the drive motor (6) is arranged inside the control box (2), an outer edge of the rotating disk (7) is fixedly connected to uniformly distributed fan blades (8), one side of the rotating disk (7) away from the drive motor (6) is fixedly connected to a coaxial clutch device (9), an output end of the coaxial clutch device (9) is installed with a matching rotating shaft (10), an end of the rotating shaft (10) is fixedly connected to a winding wheel (11), a pull rope (12) is wound inside the winding wheel (11), and a bottom end of the pull rope (12) is fixedly connected to the top of the lifting platform (3).

2. The PLC-based electrical automation control device according to claim 1, wherein a top of the control box (2) is hinged with a protective cover (13) that can be opened upward, the top of the control box (2) and left and right sides of the protective cover (13) are respectively opened with a positioning groove (14), a sealing cushion (15) is fixedly connected to a bottom groove wall of the positioning groove (14), and a positioning plate (16) extending into the positioning groove (14) is fixedly connected to a side of the protective cover (13).

3. The PLC-based electrical automation control device according to claim 1, wherein the left and right sides of the control box (2) are each provided with a vertical guide rail (17), a guide wheel (18) installed on the lifting platform (3) is provided inside the guide rail (17), and the pull rope (12) and the spring (5) both are fixedly connected to a mounting plate on the guide wheel (18).

4. The PLC-based electrical automation control device according to claim 1, wherein the lifting base (1) comprises a fixed base (19) with a cross-sectional area, a U-shaped support plate (20) is installed on the fixed base (19), the support plate (20) is internally slidably connected to a movable plate (21) that can be raised and lowered, and a connecting plate (22) fixedly connected to the bottom of the control box (2) is installed on the top of the movable plate (21).

5. The PLC-based electrical automation control device according to claim 4, wherein a pushing motor (23) below the movable plate (21) is installed inside the support plate (20), and a cam (24) driven by the pushing motor (23) to push the movable plate (21) up and down is disposed inside the support plate (20).

6. The PLC-based electrical automation control device according to claim 4, wherein a rear side baffle plate (25) fixedly connected to the bottom of the movable plate (21) is provided inside the support plate (20), an air inlet (26) is opened at a bottom of the rear side baffle plate (25), and an air inlet hole (27) opposite to the air inlet (26) is opened at a rear side wall of the support plate (20).

7. The PLC-based electrical automation control device according to claim 4, wherein a control member (28) is installed on an inner bottom wall of the support plate (20), the control member (28) internally comprises a PLC controller, a rotary speed controller, a steering controller, a temperature sensor, and a timer, an output end of the PLC controller is electrically connected to an input end of the temperature sensor, the output end of the PLC controller is electrically connected to an input end of the timer, and an output end of the timer is electrically connected to input ends of the rotary speed controller and the steering controller.

8. The PLC-based electrical automation control device according to claim 4, wherein a front side baffle plate (29) fixedly connected to a bottom front side of the movable plate (21) is provided inside the support plate (20), an air outlet (30) is opened at a bottom of the front side baffle plate (29), and an air outlet hole (31) that is located above the air outlet (30) and is opposite to the air outlet (30) is opened at a front side bottom wall of the support plate (20).

9. The PLC-based electrical automation control device according to claim 1, wherein a bottom of a rear side wall of the support plate (20) is fixedly connected to a pick-and-place cover (32) located below the air inlet hole (27) through a fixing bolt (33).

10. The PLC-based electrical automation control device according to claim 1, wherein a top of a left side wall of the control box (2) is opened with a pressure stabilization hole (34) for stabilizing an internal air pressure of the control box (2), and a filter screen (35) is installed inside the pressure stabilization hole (34).

* * * * *